United States Patent Office 3,499,041
Patented Mar. 3, 1970

3,499,041
PERFLUOROALKARYL, -ARARYL AND
-PHENOXYARYL PHOSPHINES
Christ Tamborski, Dayton, Ohio, assignor to the United
States of America as represented by the Secretary of
the Air Force
No Drawing. Filed Feb. 13, 1968, Ser. No. 705,032
Int. Cl. C07c 43/20; C07f 9/28
U.S. Cl. 260—612                                    9 Claims

ABSTRACT OF THE DISCLOSURE

This invention comprises a series of new compounds having the formula $(RC_6F_4)_3P$ wherein R is a group highly substituted with fluorine such as polyfluoroalkyl, polyfluoroaryl and polyfluorophenoxy. These compounds are particularly useful as antioxidation and anticorrosion additives for certain fluids capable of withstanding high temperatures.

---

The invention described herein may be manufactured and used by or for the United States Government for governmental purposes without payment to me of any royalty thereon.

BACKGROUND OF THE INVENTION

Field of the invention

The present invention relates to new aromatic phosphine compounds useful as antioxidants and anticorrosion agents.

Description of the prior art

Tri-(pentafluorophenyl)-phosphine has been described in the literature (J.A.C.S. 82, 4846 (1960)). A co-pending application Ser. No. 581,419, filed Sept. 21, 1966, describes the properties of this same compound as an antioxidant-anticorrosion inhibitor in polyfluoroalkyl-ether polymeric fluids. While this prior art compound has certain desirable properties in such uses, the solubility and volatility characteristics are not completely satisfactory for this purpose.

SUMMARY OF THE INVENTION

In accordance with the present invention, a new series of compounds has been found which have improved solubility and lower volatility. These new compounds are represented by the formula $(RC_6F_4)_3P$ wherein R is a fluorinated radical selected from the class of $C_nF_{2n+1}$, $C_6F_5$, $C_6F_5O$, $C_nF_{2n+1}C_6F_4$ and $C_nF_{2n+1}C_6F_4O$, wherein $n$ has a value of 1–8. Typical groups include $CF_3$, $C_2F_5$, $C_3F_7$, $C_4F_9$, $C_5F_{11}$, $C_6F_{13}$, etc.

The compounds of this invention can be synthesized by various methods including conventional types of organometallic reactions. For example:

(1) The organolithium route:

$RC_6F_4X' + C_4H_9Li \rightarrow RC_6F_4Li + C_4H_9X'$
$3RC_6F_4Li + PCl_3 \rightarrow (RC_6F_4)_3P + 3LiCl$
(Kept at low temperature of $-70°$ C.)

(2) Also the organomagnesium route can be used:

$RC_6F_4X + Mg \rightarrow RC_6F_4MgX$
$3RC_6F_4MgX + PCl_3 \rightarrow (RC_6F_4)_3P + 3MgClX$ In the above reactions R is is as defined above and X' is H, I, Br or Cl and X is I, Br or Cl.

In these reactions, the reaction conditions are those generally used for related conventional reactions. The various polyfluoro starting compounds used in the reactions are known in the prior art and can be prepared by known methods. For example, the perfluoroalkylaryl compounds can be prepared by the methods shown by E. T. McBee et al., Ind. and Eng. Chem. 39, 378 (1947).

Thus pentafluoroethyl-tetrafluorobenzene and the corresponding heptafluoropropyl, nonafluorobutyl, tridecafluorohexyl derivatives can be prepared by fluorinating ethyl benzene and other alkyl benzenes according to the method taught for fluorinating toluene in J. Org. Chem. 31, 746 (1966). It is also possible to prepare such compounds by converting corresponding ketones as follows:

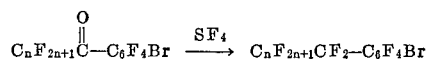

The compounds of this invention can be the various isomeric compounds in which the R group is positioned ortho, meta or para to the position on the aromatic ring at which the phosphorous is attached. These various isomers can be prepared by selecting the corresponding isomer of the $RC_6F_4X$ compound having the X in the position relative to R which is to be eventually attached to the phosphorous. Since the various isomers are substantially equivalent with respect to various antioxidant and anti corrosive properties, any of the individual isomers can be used or various mixtures thereof as inhibitors as described herein.

DESCRIPTION OF THE PREFERRED EMBODIMENTS

Typical compounds of this invention include but are not limited to the following: tris-(nonafluorobiphenyl) phosphine; tris - (pentafluorophenoxytetrafluorophenyl) phosphine; tris - (trifluoromethyltetrafluorophenyl)phosphine; tris - (pentafluoroethyltetrafluorophenyl)phosphine; tris - (heptafluoropropyltetrafluorophenyl)phosphine; tris - (nonafluoropentyltetrafluorophenyl)phosphine; etc. As previously indicated, the various compounds can be any of three positional isomers with respect to the ortho, meta and para arrangements on the phenyl groups. Moreover in the various alkyl derivative groups indicated, these can be of various branched or side-chained structures since these are considered equivalent for inhibiting oxidation and corrosion as described above.

The invention is best illustrated by the following examples. These examples are intended merely for illustrative purposes and are not intended to restrict the scope of the invention or the manner in which it can be practiced. Unless specifically provided otherwise, references to parts and percentages are by weight.

EXAMPLE I

Preparation of tris(4 - pentafluorophenoxy - 2,3,5,6-tetrafluorophenyl)phosphine A Grignard reagent is prepared by the reaction of magnesium (1.13 g, 0.047 g. at.) with 4-bromo-perfluorodiphenyl ether ($p$-$BrC_6F_4OC_6F_5$) (15 g., 0.036 mole) in tetrahydrofuran (200 ml.) solvent. A sample of the Grignard reagent is hydrolyzed and vapor phase chromatographic analysis of the hydrolyzed product shows only the expected $p$-$HC_6F_4OC_6F_5$ with no residual $p$-$BrC_6F_4OC_6F_5$ starting material. To the Grignard reagent is added a tetrahydrofuran (20 ml.) solution of phosphorus tribromide (3.52 g., 0.013 mole) while the reaction mixture is kept cool with an ice bath. The resulting reaction mixture is warmed to room temperature and stirred until analysis (vapor phase chromatography) of periodically withdrawn samples indicates maximum product formation. The reaction mixture is then hydrolized with dilute hydrochloric acid and the tetrahydrofuran solvent is removed by distillation, thereby producing a two phase system. The bottom organic layer is separated, dried and dissolved in petroleum ether having a boiling range of 30–60° C. This solution is passed through an alumina column to yield 3.6 g. of crude product. The crude product is recrystallized from isopropanol to yield 2.1 g. of product having a M.P. of 135–137°.

*Analysis.*—Calculated for $C_{36}F_{27}O_3P$: C, 42.21; P, 3.03. Found: C, 42.44; P, 3.01.

Similar results are obtained when the corresponding chloride and iodide perfluoro compounds are used as the starting materials.

EXAMPLE II

The procedure of Example I is repeated twice using, in place of 4-bromo-perfluorodiphenyl ether, the corresponding 3-bromo and 2-bromo compounds to produce the corresponding product isomers. These isomers and that of Example I are represented by the formula $$(C_6F_5OC_6F_4)_3P$$

EXAMPLE III

Preparation of tris(4-trifluoromethyl-2,3,5,6-tetrafluorophenyl)phosphine

To a solution of 4-trifluoromethyl-2,3,5,6-tetrafluorobenzene (15.0 g., 0.069 mole) dissolved in diethyl ether (150 ml.) and cooled to −65°, is added 46 ml. of a pentane solution of n-butyllithium (0.069 mole). To the resulting organolithium intermediate is added an ether solution (25 ml.) of phosphorus trichloride (3.1 g., 0.023 mole) at −65°. The reaction mixture is stirred at this temperature for approximately 5 hours and allowed to warm slowly to 0°. The precipitated salt is filtered off and the filtrate is hydrolyzed with dilute hydrochloric acid. The resulting ether layer is phase separated, dried and aspirated to remove the solvent. The resulting residual oil (12.5 g.) is eluted from an alumina column with petroleum ether (30–60°) to give a white solid which on recrystallization from a pentane-benzene solvent yields 7.1 g. (48%) of a solid with a melting point of 103–105°. The structure of the compound is identified by mass spectrometry and nuclear magnetic resonance analysis as the desired compound. Similar results are obtained when the starting compound has the hydrogen on the benzene ring replaced with chlorine, bromine and iodine respectively.

EXAMPLE IV

The procedure of Example III is repeated twice using as the starting material the corresponding 3-trifluoromethyl and 2-trifluoromethyl compounds. The corresponding isomeric products are obtained. These three isomers are represented generically by the formula

$$(CF_3C_6F_4)_3P$$

EXAMPLE V

Preparation of tris(4-nonafluorobiphenyl)phosphine

The procedure of Example I is repeated using an equivalent amount of 4-bromo-perfluorodiphenyl, in place of the corresponding diphenyl ether, to give the desired product. When the 3-bromo and 2-bromoperfluorodiphenyl compounds are used as the starting materials the corresponding isomeric products are obtained. These are represented generically by the formula $(C_6F_5C_6F_4)_3P$.

EXAMPLE VI

The procedure of Example III is repeated a number of times using as the starting compound an equivalent amount respectively of:
(a) $C_2F_5$—$C_6HF_4$
(b) $C_3F_7$—$C_6HF_4$
(c) $C_4F_9$—$C_6HF_4$
(d) $C_7F_{15}$—$C_6HF_4$
(e) $CF_3C_6F_4OC_6HF_4$
(f) $CF_3C_6F_4$—$C_6HF_4$ The following respective products are obtained:

(a) $(C_2F_5C_6F_4)_3P$
(b) $(C_3F_7C_6F_4)_3P$
(c) $(C_4F_9C_6F_4)_3P$
(d) $(C_7F_{15}C_6F_4)_3P$
(e) $(CF_3C_6F_4OC_6F_4)_3P$
(f) $(CF_3C_6F_4C_6F_4)_3P$

The various compounds prepared in the above examples are tested as corrosion and oxidation inhibitors in polyfluoroalkylether polymeric fluids of the type described in the aforementioned copending application. In addition to their excellent inhibiting properties they are found to be more soluble and less volatile than tris(pentafluorophenyl)-phosphine.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. A new compound having the formula $(RC_6F_4)_3P$, wherein R represents a polyfluoro group selected from the class consisting of $C_nF_{2n+1}$, $C_6F_5$, $C_6F_5O$,

$$C_nF_{2n+1}C_6F_4$$

and $C_nF_{2n+1}C_6R_4O$, wherein $n$ has a value of 1–8.
2. A new compound of claim 1 having the formula $(CF_3C_6F_4)_3P$.
3. A new compound of claim 1 having the formula $(C_6F_5$—$C_6F_4)_3P$.
4. A new compound of claim 1 having the formula $(C_6F_5OC_6F_4)_3P$.
5. A new compound of claim 1 having the formula $(C_2F_5C_6F_4)_3P$.
6. A new compound of claim 1 having the formula $(C_4F_9C_6F_4)_3P$.
7. A new compound of claim 1 having the formula $(C_7F_{15}C_6F_4)_3P$.
8. A new compound of claim 1 having the formula $(CF_3C_6F_4OC_6F_4)_3P$.
9. A new compound of claim 1 having the formula $(CF_3C_6F_4C_6F_4)_3P$.

References Cited

UNITED STATES PATENTS

| | | | |
|---|---|---|---|
| 3,099,690 | 7/1963 | Rauhut et al. | 260—606.5 |
| 3,342,811 | 9/1967 | Maier | 260—606.5 |
| 3,393,151 | 7/1968 | Dolle et al. | 260—606.5 X |
| 3,396,197 | 8/1968 | Sharts | 260—606.5 |

DANIEL E. WYMAN, Primary Examiner

W. F. W. BELLAMY, Assistant Examiner

U.S. Cl. X.R.

252—387, 396, 399, 407; 260—606.5